US012361476B2

(12) United States Patent
Morgan et al.

(10) Patent No.: US 12,361,476 B2
(45) Date of Patent: Jul. 15, 2025

(54) AUGMENTED REALITY ORDER ASSISTANCE

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Kelli Lee, Atlanta, GA (US); Jacob Alexander Poston, Loganville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 93 days.

(21) Appl. No.: 17/877,428

(22) Filed: Jul. 29, 2022

(65) Prior Publication Data

US 2024/0037641 A1    Feb. 1, 2024

(51) Int. Cl.
*G06F 3/01* (2006.01)
*G06Q 30/0601* (2023.01)
*G06Q 50/12* (2012.01)

(52) U.S. Cl.
CPC ......... *G06Q 30/0643* (2013.01); *G06F 3/011* (2013.01); *G06F 3/017* (2013.01); *G06Q 50/12* (2013.01)

(58) Field of Classification Search
CPC .... G06Q 30/0643; G06Q 50/12; G06F 3/011; G06F 3/017
See application file for complete search history.

(56) References Cited

U.S. PATENT DOCUMENTS

| 8,761,513 B1* | 6/2014 | Rogowski | G06V 20/20 |
| | | | 382/187 |
| 9,189,021 B2* | 11/2015 | Jerauld | G06F 1/163 |

(Continued)

FOREIGN PATENT DOCUMENTS

| AU | 2012205152 A1 * | 5/2013 | ....... G06F 17/30253 |
| AU | 2014204252 A1 * | 8/2015 | ........... G02B 27/017 |

(Continued)

OTHER PUBLICATIONS

"DynaTags: Low-Cost Fiducial Marker Mechanisms." Proceedings of the 2022 International Conference on Multimodal Interaction. N.p. Web. (Year: 2022).*

(Continued)

*Primary Examiner* — Ashford S Hayles
(74) *Attorney, Agent, or Firm* — Schwegman Lundberg & Woessner, P.A.

(57) ABSTRACT

Three-dimensional (3D) model images for menu item are maintained in a content delivery network (CDN) along with codes. The codes are printed/affixed to menus adjacent to the menu items. The menus include an anchor object that is sized in proportion to plates that serve the menu items. A user operates an augmented reality (AR)-enabled application (app) and uses a gesture to identify a code associated with a menu item from a menu. The code is decoded to contact the CDN and obtain the 3D model image corresponding to the menu item. The user centers a view-finder over the anchor object on the menu and the 3D model image is rendered on the anchor object in a scaled size and a scaled proportion for what will be provided to the user. The user may spin the 3D model to inspect proportions and ingredients of the menu item through the app.

9 Claims, 9 Drawing Sheets

(56) References Cited

U.S. PATENT DOCUMENTS

| | | | | |
|---|---|---|---|---|
| 9,652,043 | B2* | 5/2017 | Kang | G06F 3/017 |
| 9,734,634 | B1* | 8/2017 | Mott | G06F 3/002 |
| 10,149,958 | B1* | 12/2018 | Tran | G16H 50/20 |
| 10,375,060 | B1* | 8/2019 | Graves | H04W 12/77 |
| 10,657,780 | B1* | 5/2020 | Kline | G08B 3/10 |
| 10,672,191 | B1* | 6/2020 | Besecker | G06T 19/006 |
| 10,740,960 | B2* | 8/2020 | Stachniak | G06T 19/20 |
| 10,777,017 | B1* | 9/2020 | Saiger | G06F 16/951 |
| 10,963,696 | B2* | 3/2021 | Palomo | G06V 20/20 |
| 11,157,740 | B1* | 10/2021 | Agarwal | G06F 3/04845 |
| 11,436,666 | B1* | 9/2022 | Dalmazzo | G01S 17/89 |
| 12,026,563 | B1* | 7/2024 | Wallace | G06K 1/14 |
| 12,062,233 | B2* | 8/2024 | Tokitake | G06F 3/0487 |
| 2013/0147836 | A1* | 6/2013 | Small | G06T 19/006 345/633 |
| 2013/0222367 | A1* | 8/2013 | Mariappan | G06T 19/006 345/419 |
| 2014/0147829 | A1* | 5/2014 | Jerauld | G06F 3/011 434/430 |
| 2014/0184496 | A1* | 7/2014 | Gribetz | G02B 27/017 345/156 |
| 2014/0210857 | A1* | 7/2014 | Liu | G06T 19/006 345/633 |
| 2015/0227222 | A1* | 8/2015 | Sako | G02B 27/017 345/173 |
| 2015/0316985 | A1* | 11/2015 | Levesque | G06F 3/016 345/156 |
| 2017/0323481 | A1* | 11/2017 | Tran | H04N 23/611 |
| 2018/0018825 | A1* | 1/2018 | Kim | G02B 27/0093 |
| 2018/0089770 | A1* | 3/2018 | Bostick | G06Q 50/12 |
| 2018/0144821 | A1* | 5/2018 | Irani-Cohen | G06Q 30/0631 |
| 2018/0189901 | A1* | 7/2018 | Poisner | G06Q 50/12 |
| 2019/0213416 | A1* | 7/2019 | Cho | G06V 20/20 |
| 2020/0082633 | A1* | 3/2020 | Rom | G06T 17/10 |
| 2020/0103980 | A1* | 4/2020 | Katz | G06F 3/0482 |
| 2020/0257245 | A1* | 8/2020 | Linville | G03H 1/2249 |
| 2020/0311144 | A1* | 10/2020 | Sandhu | G06F 16/434 |
| 2022/0058875 | A1* | 2/2022 | LaMountain | H04N 21/8545 |
| 2022/0358689 | A1* | 11/2022 | Bahulkar | G06V 20/68 |
| 2022/0358729 | A1* | 11/2022 | Hong | G10L 15/22 |
| 2023/0196766 | A1* | 6/2023 | Pla I Conesa | G06V 10/7715 382/190 |
| 2023/0210443 | A1* | 7/2023 | Waterhouse | A61B 7/00 |
| 2023/0410441 | A1* | 12/2023 | Moll | G06T 19/006 |

FOREIGN PATENT DOCUMENTS

| | | | | |
|---|---|---|---|---|
| AU | 2018102024 A4 | * | 1/2019 | |
| CA | 2898668 A1 | * | 7/2014 | G06K 9/00671 |
| CA | 2906399 A1 | * | 10/2014 | G06F 17/275 |
| CN | 106022873 A | * | 10/2016 | G06Q 30/0635 |
| FR | 3071650 A1 | * | 3/2019 | |
| GB | 2476200 A | * | 6/2011 | G06F 3/0482 |
| IN | 202141036705 A | * | 12/2021 | |
| JP | 2018101312 A | * | 6/2018 | |
| KR | 20200103933 A | * | 9/2020 | |
| KR | 20210109166 A | * | 9/2021 | |
| KR | 20220039863 A | * | 3/2022 | |
| TW | M499617 U | * | 4/2015 | |
| TW | 201710871 A | * | 3/2017 | |
| WO | WO-2012051040 A1 | * | 4/2012 | G06K 9/00 |
| WO | WO-2014145193 A1 | * | 9/2014 | A63F 13/213 |
| WO | WO-2019057978 A1 | * | 3/2019 | |
| WO | WO-2019092435 A1 | * | 5/2019 | G06F 3/0482 |
| WO | WO-2020031795 A1 | * | 2/2020 | G02B 27/017 |

OTHER PUBLICATIONS

Chitra, D. Ramya, and P Kaliraj. "Augmented Reality Changing the Food and Beverage Industries." Innovating with Augmented Reality. 1st ed. United Kingdom: CRC Press, 2022. 53-69. Web. (Year: 2022).*

Kavitha, M et al. "Virtual Reality (Hologram) Based Food Supply System in Smart Restaurant Based Menu Ordering System." 2022 7th International Conference on Communication and Electronics Systems (ICCES). IEEE, 2022. 449-454. Web.*

* cited by examiner

GESTURE DETECTION TO IDENTIFY WHERE
THE FINGER IS POINTING

AUGMENTED REALITY ORDER ASSISTANCE

BACKGROUND

Many people find it troublesome ordering food from restaurant menus. The portion sizes, ingredients, and preparation system are often difficult to visualize from reading a traditional menu. This situation is particularly prevalent when the menu is written in a customer's non-native language.

In short, it is hard to tell what an item on a menu is just from the description. There is limited space on printed menus to provide item images and menus are usually written in the local language which makes it difficult for tourists to know what they are ordering. Customers are disappointed when what they order is not what they expected in terms of portion size and/or ingredients.

In these situations, customers are more likely to return their items to the kitchen which causes loss of food and takes additional time away from the cooking staff. The customers are also less likely to return to the restaurant.

SUMMARY

In various embodiments, methods and a system for providing augmented reality (AR) order assistance are presented. An AR-enabled application on a user-operated device is used to view a menu. The menu includes codes and an anchor image for a plate. Each code corresponds to a menu item on the menu and links to a content delivery network. The content delivery network (CDN) includes three-dimensional (3D) image renderings of food items or meals that are proportional to what is actually provided by a restaurant for given menu selections from the menu. The AR-enabled application identifies a selected code when the user points at a code through the viewfinder of the user interface of the AR-enabled application. This causes the application to obtain the 3D and proportional rendering of the meal or food item identified by the code through interaction with the CDN. The user interface instructs the user to center the plate printed on the menu within an oval rendered through the view-finder of the user interface and the selected meal or food item is rendered in 3D and in size proportion that the restaurant will provide on top of the plate for viewing by the user. The user can use gestures to spin and reorient the rendered meal to see the ingredients, items, and sized proportions. In an embodiment, a button presented within the viewfinder of the user interface when activated by the user speaks the menu item selected in a native language that the menu was written in so that the user, who may not speak the native language, can communicate the menu item to a waiter at the restaurant for ordering.

According to an aspect, a method of providing AR ordering assistance is presented. A view-finder is presented through a user interface on a display of a user device. Codes associated with menu items of a menu are identified within a field-of-view of the view-finder. A selected code for a selected menu item is determined and a 3D model image for the menu item from a CDN using the code. An anchor object is identified in the field-of-view from the menu and the 3D model image is rendered on top of the anchor object within the view-finder for viewing and for interaction by a user to inspect a size, a proportion, and ingredients associated with the selected menu item.

DETAILED DESCRIPTION

As stated above, customers are often surprised by menu items ordered at restaurants. For tourists, who do not speak the native language, an ordered menu item may come as a surprise and something the tourist will not eat. But it is not just tourist that are often surprised by what they order at restaurants, often the proportion or amount of food delivered is far greater than expected by the customer, such that had the customer known the proportion size, the customer may have ordered a half order or split the order with another party who is with the customer. These problems are solved by the AR order assistance techniques provided herein and below.

Figure 1A:
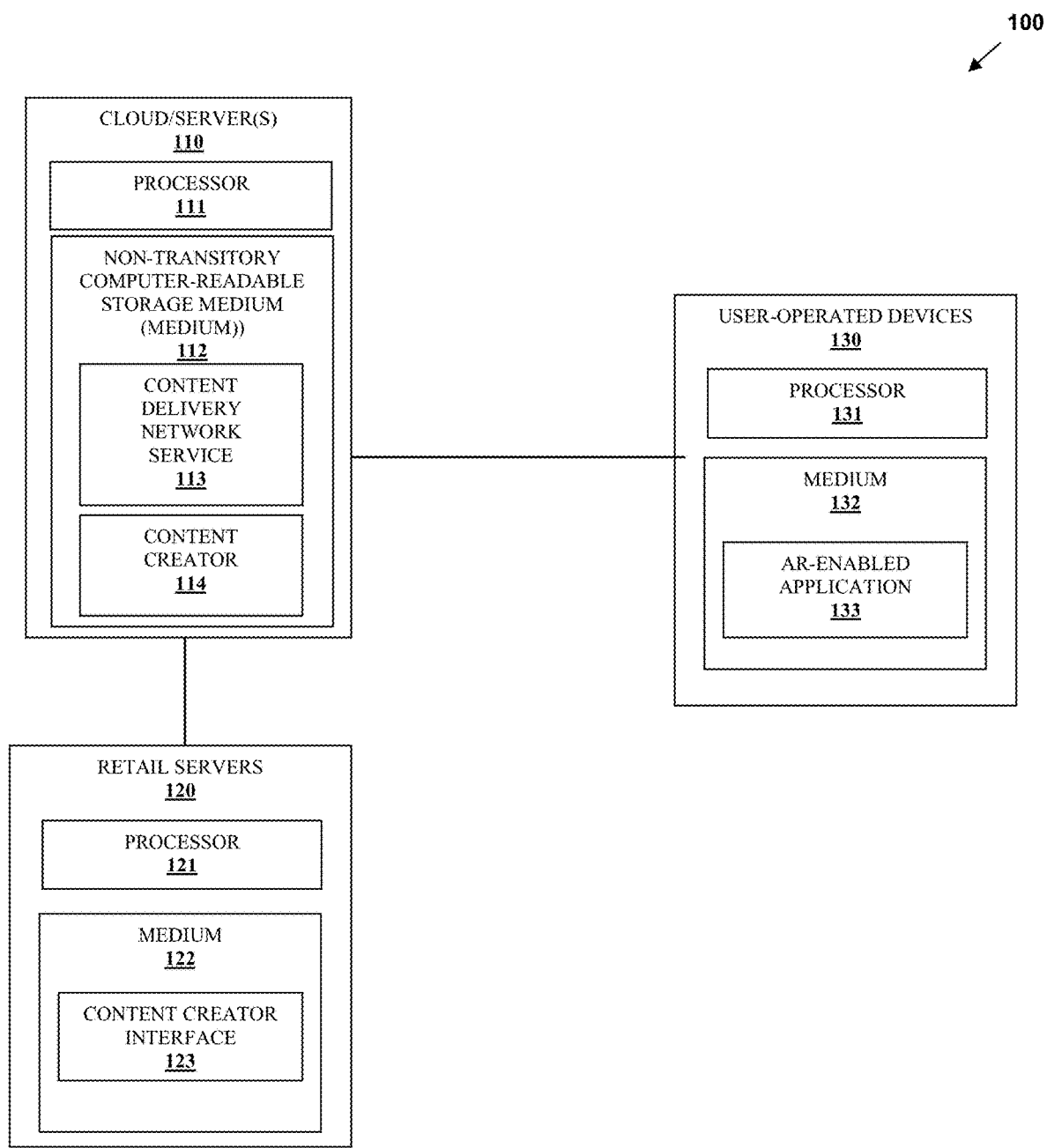
FIG. 1A is a diagram of system for augmented reality (AR) order assistance, according to an example embodiment.
Figure 1B:
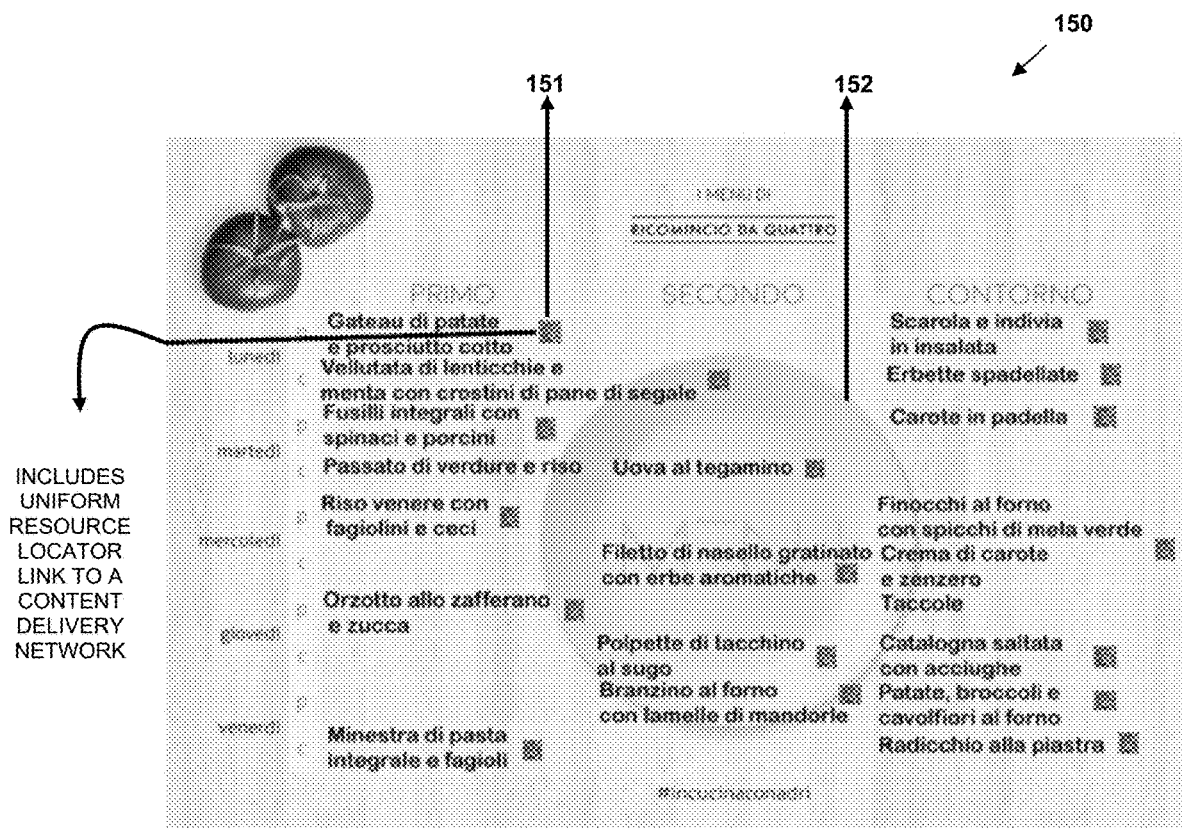
FIG. 1B is an image of an example menu with codes and an anchor image, according to an example embodiment.

FIG. 1B is a diagram of a system 100 for AR order assistance, according to an example embodiment. It is to be noted that the components are shown schematically in greatly simplified form, with only those components relevant to understanding of the embodiments being illustrated.

Furthermore, the various components (that are identified in the FIG. 1B) are illustrated and the arrangement of the components is presented for purposes of illustration only. It is to be noted that other arrangements with more or fewer components are possible without departing from the teachings of AR order assistance, presented herein and below.

As used herein, the terms "user," "customer," "diner," "patron," and/or "consumer" may be used interchangeably and synonymously herein and below. These terms refer to the individual to which AR assistance is being provided during ordering at a restaurant.

As used herein, a "menu item" refers to a single food item or multiple different food items associated with a menu selection from a menu of a restaurant. For example, a menu item may be a hamburger or may be a hamburger with French fries.

As will be demonstrated herein and below, system 100 provides AR order assistance through a cloud-based content delivery network (CDN) service and an AR-enabled application installed on or accessible from a mobile device operated by a user. Menus include codes, such as Quick Response (QR) codes, that are printed or affixed as stickers on a given restaurant's menu adjacent to specific menu items. Either the front or the back of the menus include an anchor image, such as a plate, which is sized to an actual size of the plates used by the restaurant to serve their menu items. Restaurants also use an interface to the CDN service to provide 3D and proportioned sized images of each menu item. The codes when activated by the AR-enabled application cause interaction with the CDN service to obtain a specific menu item's 3D and proportioned sized image. A view-finder rendered within the AR-enabled application asks the user to center a superimposed oval on the anchor image of the menu and the selected menu item is rendered in 3D, scaled, and proportionally sized on top of the anchor image within the view-finder to the user. The user can use their fingers placed within the field-of-view of the view-finder to rotate or spin the rendering of the menu item on the anchor image for purposes of inspecting the ingredients and sizes of food items associated with the menu item relative to the anchor object presented within the view-finder. A variety of embodiments are also discussed herein and below.

It is to be noted that the presented 3D model image is scaled such that it is proportional on a display of device 130 of within the view-finder of the device to what the actual menu item would be when delivered. Thus, when same size and proportion are referenced herein and below it is noted that the actual 3D model image is proportionally scaled based on the size of the display or view-finder and the presentation of the anchor object within being presented within the view-finder.

System 100 includes at least one cloud or server 110 (hereafter referred to as just cloud 110), a plurality of retail servers 120, and a plurality of user-operated devices 130. Cloud 110 includes a processor 111 and a non-transitory computer-readable storage medium 112, which includes instructions for a CDN service 113 and a content creator 114, which when executed by processor 111 in turn causes processor 111 to perform operations discussed herein and below with respect to 113 and 114.

Each retail server 120 includes a processor 121, a non-transitory computer-readable storage medium 122, which includes executable instructions from a content creator interface 123. The instructions when executed by processor 121 cause processor 121 in turn to perform operations discussed herein and below for 123.

Each user-operated device 130 includes a processor 131 and a non-transitory computer-readable storage mediums 132, which includes instructions for an AR-enabled application (app) 133. The instructions when executed by the processor 131 cause processor 131 in turn to perform operations discussed herein and below for 133.

Initially, retailers, such as restaurants, subscribe to cloud 100 for the services provided to their customers. An agent of a given retailer operates content creator interface for identifying each menu item offered by the retailer and providing a 3D image of 3D model image of an actual prepared and sized menu item. The agent may use a camera enabled with a light detection and ranging (LIDAR) scanner to provide the 3D model image. A significant number of phones available today offer the LIDAR scanner, such that the agent captures all sides up, down, and around the menu item in a 3D model image. The agent uploads the 3D model image of the menu item, along with a reference used by the retailer on its menu for the menu item through the content creator interface to content creator 114. The agent also provides a two-dimensional image of a plate that the menu item is served on through the content creator interface 123 to the content creator 114. The content creator 114 returns a unique code for referencing the menu item to the agent through the content creator interface 123. The content creator 114 instructs the agent to print menus with the plate and in the size of the actual plate on its menus and to either print each menu item with its corresponding returned code adjacent to the corresponding menu item or to print the code in a sufficient size and affix the code adjacent to its corresponding returned code.

In an embodiment, when the menu item is a sandwich, the content creator interface 123 and/or content creator 114 instructs the agent to cut the sandwich in half and take the 3D model image such that the ingredients of the sandwich are visible as open faced. This permits any customer to see the ingredients or sauces, which may be present on the sandwich, and which may be indiscernible if the sandwich were not effectively opened up by cutting it in half.

Figure 1C:
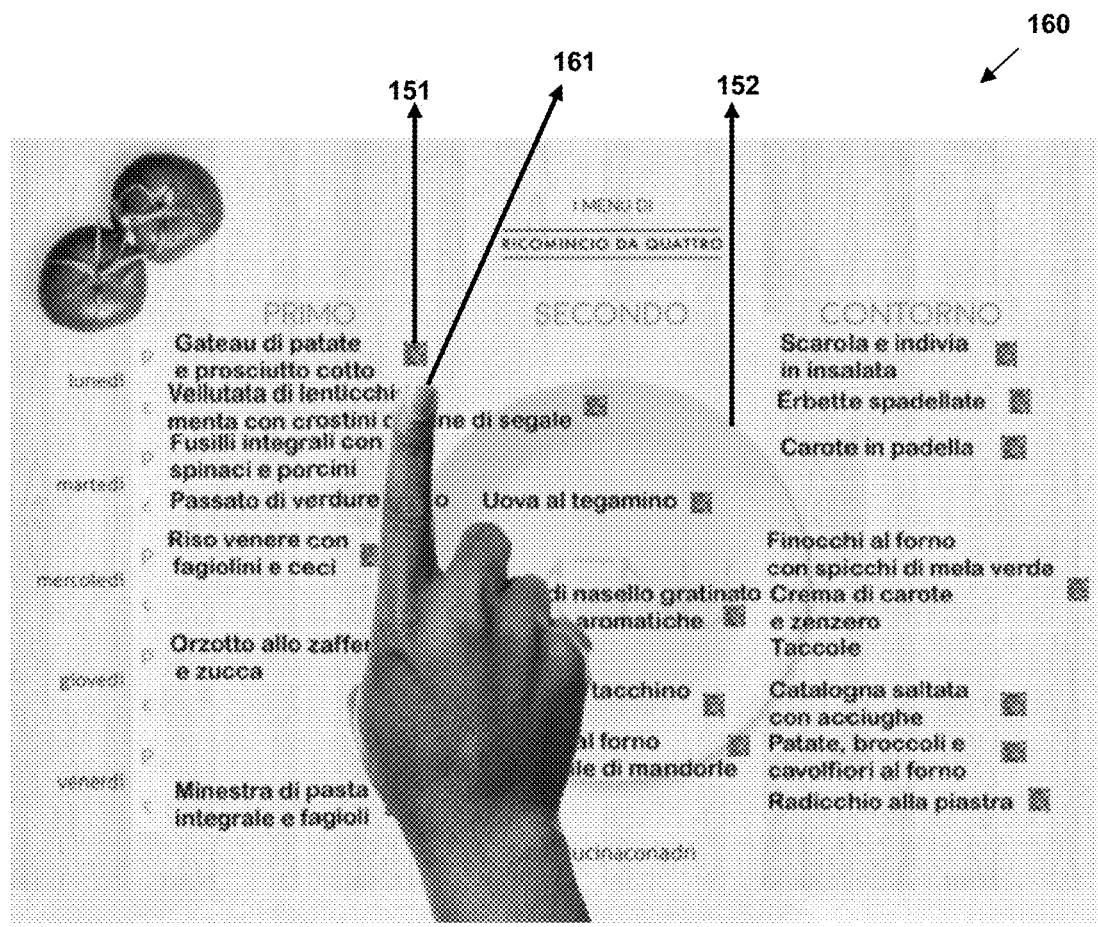
FIG. 1C is an image rendered through a view-finder of an AR-enabled application illustrating a user selection of a menu item, according to an example embodiment.
Figure 1D:
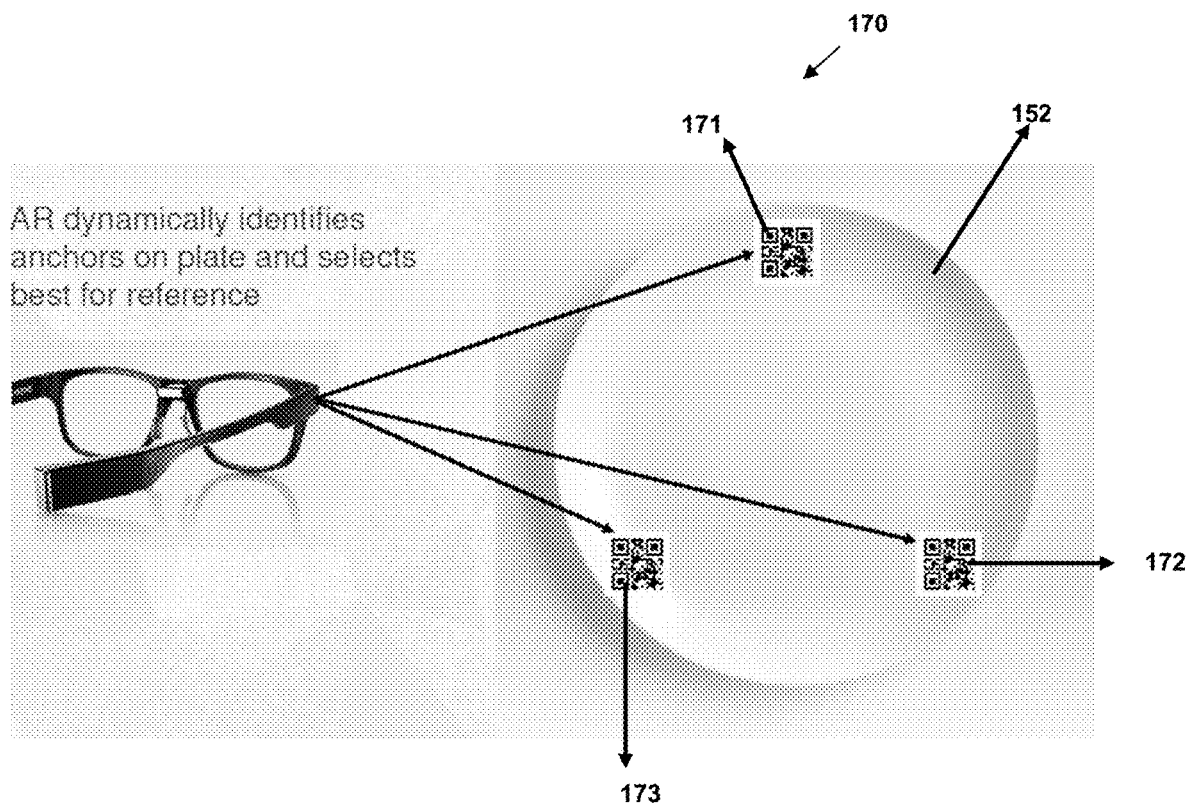
FIG. 1D is an image rendered the view finder identifying the anchor codes on an anchor image, according to an example embodiment.

The discussion that follows is described within the context of an example menu shown in FIGS. 1B-1D. It is noted that other types of menus may be used, and this is presented for purposes of illustration and comprehension only, such that embodiments herein should not be limited to the menu depicted in FIGS. 1B-1D.

An example, image of a menu 150 is shown in FIG. 1B. The anchor image 152 is the background plate 152 situated behind menu items on the menu. Each menu item includes its assigned and adjacent QR code 151. The content creator 114 generates each code with a Uniform Resource Locator (URL) link to the CDN service 113. This ensures when a user is operating device 130 and selects a code 151 for a menu item, the code is decoded by the AR-enabled application 133, the URL is obtained and a reference to the retailer, and the retailer's menu item from the code by the AR-enabled application 133. The URL link is traversed by the AR-enabled application 133 to interact with the CDN service 113 and the retailer identifier and menu item identifier is provided to the CDN service 113. The CDN service 113 uses the retailer identifier and the menu item identifier to locate the 3D model image of the food corresponding to the menu item for the retailer.

FIG. 1C illustrates a technique by which the AR-enabled application 133 identifies a user's selection of a given menu item. The user places a finger into the view-finder of the user interface of the AR-enabled application 133 and points at the code desired by the user. The pointing is a gesture 161 made by the user within the field-of-view of the view-finder. AR-enabled application 133 recognizes the finger and the gesture 113 and extends a line from the top of the finger to a next code visible from the menu, which is also within the field-of-view of the view-finder. The user's hand and finger are superimposed over the menu in the view-finder, such that AR-enabled application 133 can identify the hand, identify the finger, generate a line from the top of the finger, and identify the selected code 151. The code is decoded to obtain the URL to the CDN service 113, obtain the retailer identifier, and obtain the menu item identifier.

In an embodiment, the angle of the finger is calculated by the AR-enabled application 113 and a line at the same angle is extended approximately % centimeter out from the tip of the finger to identify the selected code 151 made by the user through the gesture 161. In an embodiment, when multiple codes are presented such that a camera of device 130 is struggling to latch onto a desired code of the user, the user may select the correct code by touching the correct code on the display of device 120 using the user interface which is rendering the view-finder of the camera for device 120.

Once the user makes a menu item selection through selection of a code from the menu, the AR-enabled app 133 activates an AR viewer within the user interface of AR-enabled app 133. This allows for identification of the anchor image 152 from the menu. The anchor image 152 or plate 152 is configured with at least three anchor codes 171, 172, and 173 (shown in FIG. 1D). The AR viewer superimposes an oval within the view-finder and instructs the user to move the oval over top of the plate 152 such that the anchor codes 171-173 are within the oval. The anchors 171-173 are used by the AR viewer to control scale, portion size, and location of the 3D model image of the selected menu item returned from the CDN service 113. In an embodiment, the plate 152 may include special textures on it that can be used as anchor points by the AR viewer in place of codes.

The AR viewer of AR-enabled app 133 obtains the 3D model image of the selected menu item made by the user. AR viewer superimposes and renders the menu item 181 (shown in FIG. 1E) in a same size and proportions (scaled based on the display of device 130 and anchor object presented on the display within the view-finder) that will be provided by the kitchen of the restaurant on the plate 152. The user can then either use the touchscreen on the user's device 131 or fingers placed in the field-of-view of the user interface of AR-enabled app 133 to spin the menu item around and inspect its ingredients, food components, and proportions before the user decides whether or not to order the menu item at the restaurant.

In an embodiment, the user interface displays a small button on a display of device 130 to the user. When the button is touched, the AR-enabled app 133 speaks the menu items name in a native language associated with the written language of the menu. For example, an American ordering in Italy from an Italian menu can press a selected item to have AR-enabled app 133 speak through a speaker of device 130 the menu item name in native Italian to the waiter.

In an embodiment, the retailer through the agent may also provide through the content creator interface metadata associated with the menu items and 3D model images. The metadata may include a listing of ingredients and nutritional information associated with the corresponding menu item. AR-enabled application 133 may provide an option within the user interface to view the metadata and/or the metadata may be displayed in a bottom section of the display while the user is operating the view-finder.

Figure 1E:
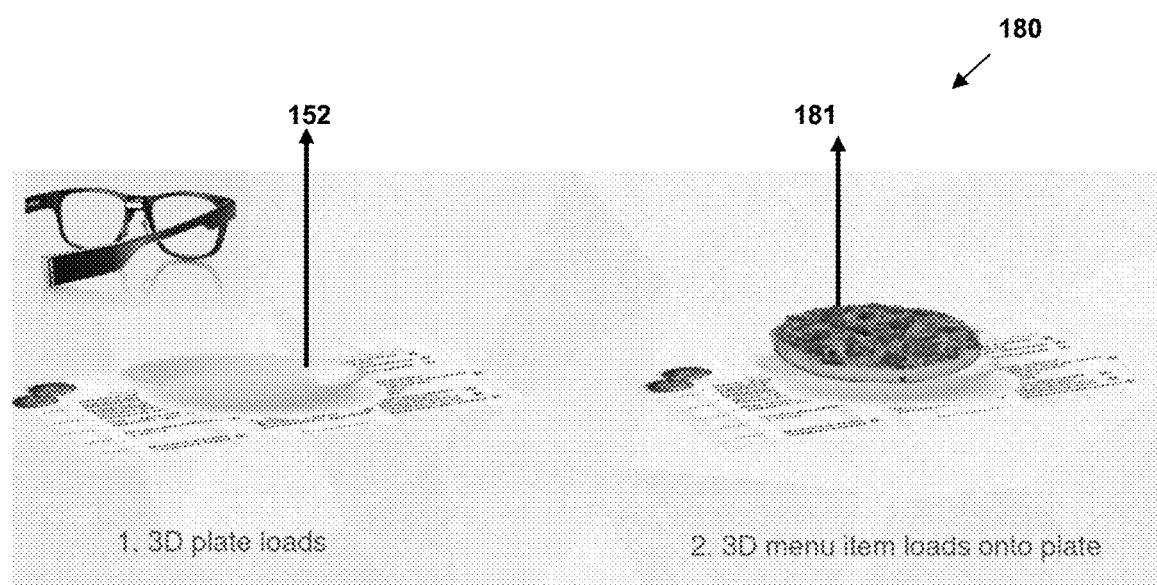
FIG. 1E are images rendered through the view-finder illustrating an empty anchor image and an anchor image rendered with a three-dimensional (3D) and proportional depiction of the menu item selected in FIG. 1C, according to an example embodiment.

In an embodiment, device 130 is a phone, a tablet, or a wearable processing device, such as processor-enabled glasses or goggles (shown in FIGS. 1D and 1E). When device 130 is glasses or goggles the user touches the rims, sides, or bridge of the glasses or goggles to navigate and select any presented user interface options provided by AR-enabled app 133.

Figure 2A:
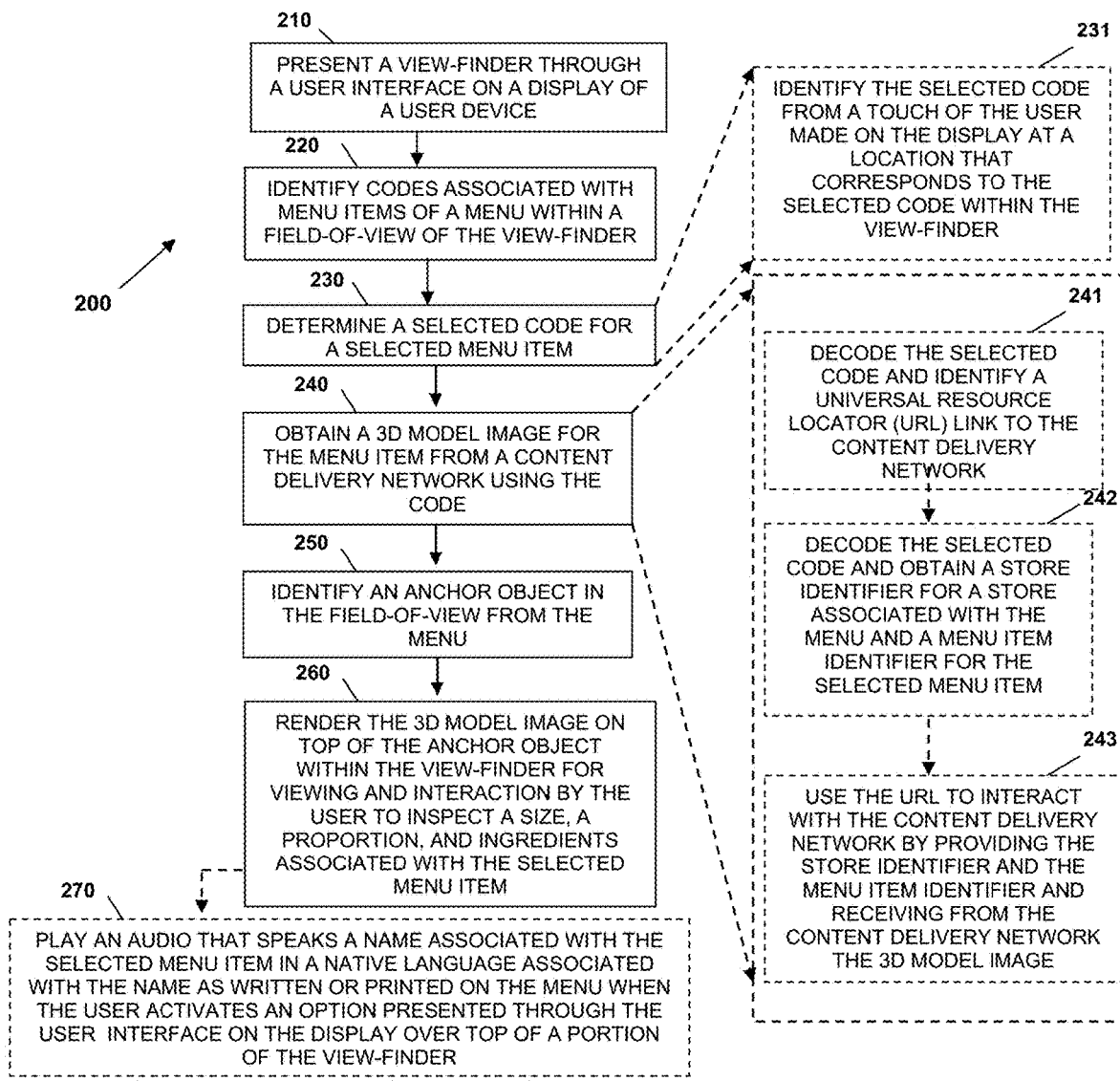
FIG. 2A is a diagram of a method for AR order assistance, according to an example embodiment.
Figure 2B:
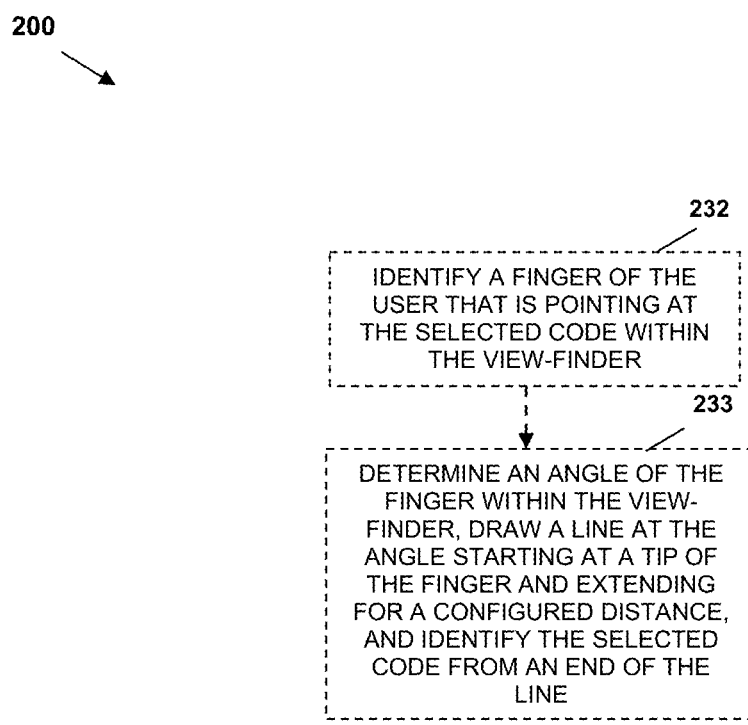
FIG. 2B is a diagram of embodiments of the method of FIG. 2A.
Figure 2C:
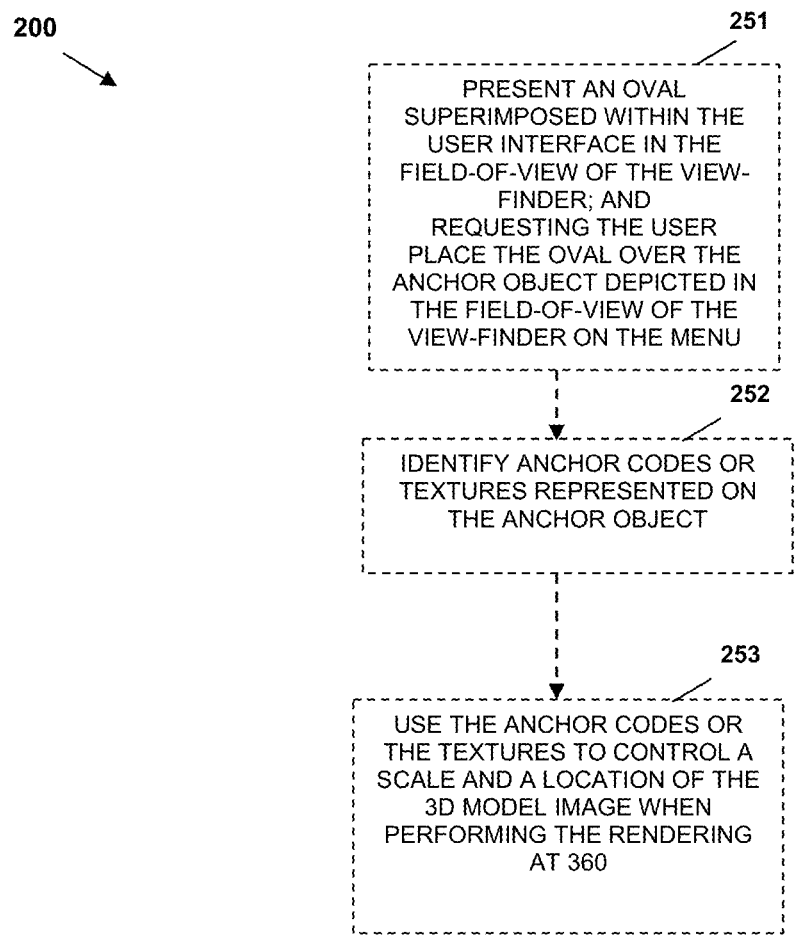
FIG. 2C is a diagram of additional embodiments of the method of FIG. 2A.

The above-referenced embodiments and other embodiments are now discussed with reference to FIGS. 2A, 2B, 2C, and 3. FIGS. 2A, 2B, and 2C are diagrams of a method 200 for AR order assistance, according to an example embodiment. The software module(s) that implements the method 200 is referred to as an "AR order assistant." The AR order assistant is implemented as executable instructions programmed and residing within memory and/or a non-transitory computer-readable (processor-readable) storage medium and executed by one or more processors of a device or set of devices. The processor(s) of the device(s) that executes the AR order assistant are specifically configured and programmed to process the AR order assistant. The AR order assistant may have access to one or more network connections during its processing. The network connections can be wired, wireless, or a combination of wired and wireless.

In an embodiment, the AR order assistant executes on user-operated device 120. In an embodiment, the device 120 is a phone, a laptop, or a wearable processing device such as glasses or goggles.

In an embodiment, the AR order assistant is one, all, or some combination of 133. In an embodiment, AR order assistant presents another, and in some ways, an enhanced processing perspective from that which was discussed above with AR-enabled application 133 of system 100.

At 210 (shown in FIG. 2A), the AR order assistant presents a view-finder through a user interface on a display of a user device 130. The view-finder displays the physical surroundings in real time on the display of a user by using a camera of device 130.

At 220 (shown in FIG. 2A), the AR order assistant identifies codes associated with menu items of a menu within a field-of-view of the view-finder. The AR order assistant identifies from the objects in the field-of-view codes on a menu, such as QR codes, bar codes, etc.

At 230 (shown in FIG. 2A), the AR order assistant determines a selected code for a selected menu item that a user desires to select. This can be done in a variety of manners.

For example, and in an embodiment at 231 (shown in FIG. 2A), the identifies the selected code from a touch of the user. The touch is made on the display of device 130 at a location that corresponds to the selected code within the view-finder.

In another example embodiment, at 232 (shown in FIG. 2B), the AR order assistant identifies a finger of the user that is pointing at the selected code within the view-finder. In an embodiment of 232 and at 233 (shown in FIG. 2B), the AR order assistant determines an angle of the finger within the view-finder, draws a line at that angle starting at a tip of the finger and extending for a configured distance, and identifies the selected code from an end of the line drawn.

At 240 (shown in FIG. 2A), the AR order assistant obtains a 3D model image for the menu item from a CDN. In an embodiment, the CDN is the CDN service 113.

In an embodiment, at 241 (shown in FIG. 2A), the AR order assistant decodes the selected code and identifies a URL link to the CDN. In an embodiment of 241 and at 242 (shown in FIG. 2A), the AR order assistant decodes the selected code further and identifies a store identifier for a store associated with the menu and a menu item identifier for the selected menu item. In an embodiment of 242 and at 243 (shown in FIG. 2A), the AR order assistant uses the URL to interact with the CDN by providing the store identifier and the menu item identifier and receiving, from the CDN, the 3D model image.

At 250 (shown in FIG. 2A), the AR order assistant identifies an anchor object in the field-of-view from the menu. That is after the 3D model image is obtained from the CDN, the AR order assistant begins looking for the anchor object present in the field-of-view of the view-finder.

In an embodiment, at 251 (shown in FIG. 2C), the AR order assistant presents an oval superimposed within the user interface in the field-of-view of the view-finder. The AR order assistant further requests that the user place the oval over the anchor object depicted in the field-of-view of the view-finder on the menu.

In an embodiment of 251 and at 252 (shown in FIG. 2C), the AR order assistant identifies anchor codes or textures represented on the anchor object. In an embodiment of 252 and at 253 (shown in FIG. 2C), the AR order assistant uses the anchor codes or the textures to control a scale and a location of the 3D model image when performing the rendering at 360 below.

At 260 (shown in FIG. 2A), the AR order assistant renders the 3D model image on top of the anchor object within the view-finder for viewing and interacting by the user. This allows the user to inspect a size, a proportion, and ingredients associated with the selected menu item before ordering the menu item.

In an embodiment, at 270 (shown in FIG. 2A), the AR order assistant plays an audio that speaks a name associated with the selected menu item in a native language associated with the name as written or printed on the menu when the user activates an option presented through the user interface on the display of device 130 over top of a portion of the view-finder. This allows a non-native speaking user to order the selected menu item by having AR order assistant speak the name of the menu item to a waiter in a native language of the waiter.

Figure 3:
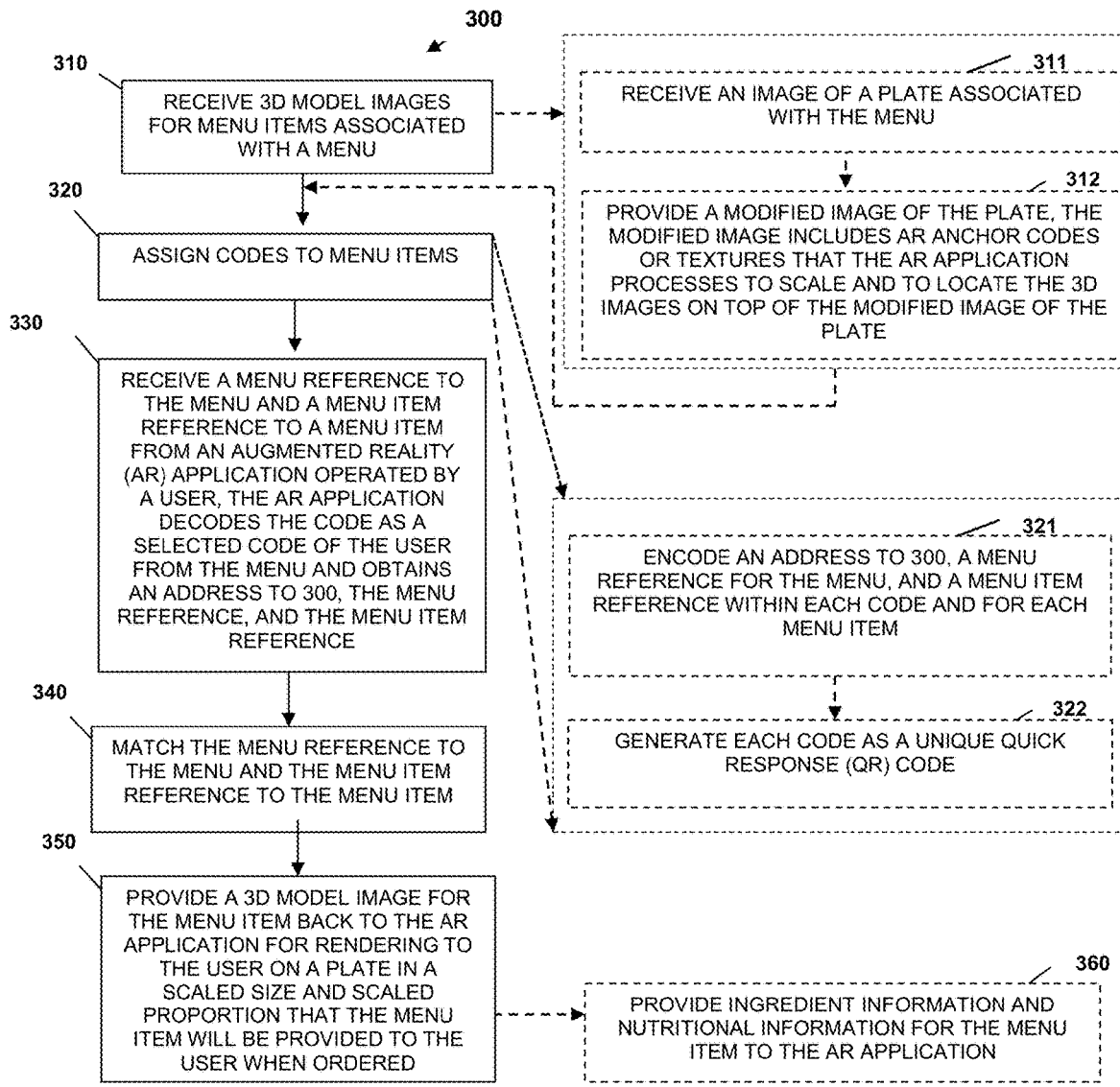
FIG. 3 is a diagram of another method for AR order assistance, according to an example embodiment.

FIG. 3 is a diagram of a method 300 for AR order assistance, according to an example embodiment. The software module(s) that implements the method 300 is referred to as an "AR order assistance service." The AR order assistance service is implemented as executable instructions programmed and residing within memory and/or a non-transitory computer-readable (processor-readable) storage medium and executed by one or more processors of a device or set of devices. The processor(s) of the device that executes the AR order assistance service are specifically configured and programmed to process the AR order assistance service. The AR order assistance service may have access to one or more network connections during its processing. The network connections can be wired, wireless, or a combination of wired and wireless.

In an embodiment, the device that executes AR order assistance service is cloud 110. In an embodiment, the device that executes the AR order assistance service is server 110. In an embodiment, the device that executes the AR order assistance service is a retail server 120.

In an embodiment, the AR order assistance service is all of, or some combination of, 113, 114, and/or 123. The AR order assistance service presents another and, in some ways, an enhanced processing perspective from that which was described above for CDN service 113, content creator 114, and/or content creator interface 123 of system 100.

The AR order assistance service interacts with method 200. That is, AR order assistance service provides 3D model images to method 200 when provided a code from a menu for a menu item. In an embodiment, the AR order assistance service may also provide metadata associated with the menu item, such as ingredients and nutritional food information.

At 310, AR order assistance service receives 3D model images for menu items associated with a menu. This can be received from an agent of a store or retailer associated with the menu via content creator interface 123 as discussed above with system 100.

In an embodiment, at 311, the AR order assistance service receives an image of a plate associated with the menu. In an embodiment of 311 and at 312, the AR order assistance service provides a modified image of the plate. The modified image includes AR anchor codes or textures that an AR application 133 processes to scale and to locate or to position the 3D images on top of the modified image of the plate.

At 320, the AR order assistance service assigns codes to menu items. That each menu item is associated with its own unique code that is generated to identify the corresponding menu item.

In an embodiment, at 321, the AR order assistance service encodes an address or a link to the AR order assistance service (method 300), a menu reference for the menu, and a menu item reference within each code for each menu item. In an embodiment of 321 and at 322, the AR order assistance service generates each code as a unique QR code for the corresponding menu item.

At 330, the AR order assistance service receives a menu reference to a menu and a menu item reference to a menu item from an AR application 133 that is being operated by a user. The AR application 133 decodes the code as a selected code of the user from the menu and obtains an address to the AR order assistance service or method 300, the menu reference, and the menu item reference.

At 340, the AR order assistance service matches the menu reference to the menu. The AR order assistance service also matches the menu item reference to the selected menu item desired by the user who is operating the AR application 133.

At 350, the AR order assistance service provides a 3D model image for the menu item back to the AR application 133. The AR application 133 renders the 3D model image on a plate depicted in a view-finder in a scaled size and a scaled proportion that the menu item will be provided to the user when ordered.

In an embodiment, at 360, the AR order assistance service provides ingredient information and nutritional information for the menu item to the AR application 133. The AR application 133 may then display this to the user or allow an interface option that when selected by the user is presented to the user.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    presenting a viewfinder through a user interface on a display of a user device;
    identifying codes associated with menu items of a menu within a field-of-view of the viewfinder;
    determining a selected code for a particular menu item;
    wherein determining further comprises:
        identifying a finger of a user that is pointing at the selected code within the viewfinder;

wherein identifying the finger comprises:
- determining an angle of the finger within the viewfinder;
- drawing a line at the angle starting at a tip of the finger and extending for a configured distance; and
- identifying the selected code from an end of the line;

obtaining a three-dimensional (3D) model image for the particular menu item from a content delivery network (CDN) using the selected code;

identifying an anchor object in the field-of-view from the menu; and rendering the 3D model image as an overlay on the anchor object within the viewfinder.

2. The method of claim 1 further comprising:
playing an audio that speaks a name associated with the particular menu item in a native spoken language associated with the name written or printed on the menu when the user activates an option presented through the user interface on the display over top of a portion of the viewfinder.

3. The method of claim 1 further comprising: rendering a listing of ingredients and nutritional information for the particular menu item within the user interface superimposed on the field-of-view of the viewfinder with the 3D model image.

4. A method comprising:
- presenting a viewfinder through a user interface on a display of a user device;
- identifying codes associated with menu items of a menu within a field-of-view of the viewfinder;
- determining a selected code for a particular menu item;
- wherein determining further includes:
  - identifying the selected code from a touch of a user made on the display at a location that corresponds to the selected code within the viewfinder;
- obtaining a three-dimensional (3D) model image for the particular menu item from a content delivery network (CDN) using the selected code;

wherein obtaining comprises:
- decoding the selected code and identifying a universal resource locator (URL) link to the CDN;
- identifying an anchor object in the field-of-view from the menu; and
- rendering the 3D model image as an overlay on the anchor object within the viewfinder.

5. The method of claim 4, wherein decoding further includes decoding the selected code and obtaining a store identifier for a store associated with the menu and a menu item identifier for the particular menu item.

6. The method of claim 5, wherein decoding further includes using the URL to interact with the CDN by providing the store identifier and the menu item identifier and receiving from the CDN the 3D model image.

7. A method, comprising:
- presenting a viewfinder through a user interface on a display of a user deivce;
- identifying codes associated with menu items of a menu within a field-of-view of the viewfinder;
- determining a selected code for a particular menu item;
- obtaining a three-dimensional (3D) model image for the particular menu item from a content delivery network (CDN) using the selected code;
- identifying an anchor object in the field-of-view from the menu;
- wherein identifying th anchor object further includes:
  - presenting an oval superimposed within the user interface in the field-of-view of the viewfinder; and
  - requesting a user place the oval over the anchor object depicted in the field-of-view on the menu; and
- rendering the 3D model image as an overlay on the anchor object within the viewfinder.

8. The method of claim 7, wherein requesting further includes identifying anchor codes or textures represented on the anchor object.

9. The method of claim 8, wherein identifying the anchor codes or the textures further includes using the anchor codes or the textures to control a scale and a location of the 3D model image when performing the rendering.

\* \* \* \* \*